US006877041B2

(12) United States Patent
Sullivan et al.

(10) Patent No.: US 6,877,041 B2
(45) Date of Patent: Apr. 5, 2005

(54) PROVIDING SECURE ACCESS TO NETWORK SERVICES

(75) Inventors: James M. Sullivan, The Woodlands, TX (US); James A. Keddie, Richmond, TX (US)

(73) Assignee: Omnes, Houston, TX (US)

( * ) Notice: Subject to any disclaimer, the term of this patent is extended or adjusted under 35 U.S.C. 154(b) by 621 days.

(21) Appl. No.: 09/898,977

(22) Filed: Jul. 3, 2001

(65) Prior Publication Data

US 2001/0042215 A1 Nov. 15, 2001

Related U.S. Application Data

(63) Continuation of application No. 09/039,197, filed on Mar. 13, 1998, now abandoned.

(51) Int. Cl.[7] .............................................. G06F 15/16
(52) U.S. Cl. ........................ 709/238; 709/243; 713/201
(58) Field of Search ................................ 709/229, 245, 709/225, 227, 238, 243, 223, 224, 249; 713/200, 201

(56) References Cited

U.S. PATENT DOCUMENTS

| | | | | | |
|---|---|---|---|---|---|
| 5,734,865 A | * | 3/1998 | Yu | ............................. | 709/250 |
| 5,835,726 A | * | 11/1998 | Shwed et al. | ............... | 709/229 |
| 5,835,727 A | * | 11/1998 | Wong et al. | ................. | 709/238 |
| 5,898,830 A | * | 4/1999 | Wesinger et al. | ........... | 713/201 |
| 5,920,699 A | * | 7/1999 | Bare | ........................... | 709/225 |
| 6,009,475 A | * | 12/1999 | Shrader | ...................... | 709/249 |
| 6,032,259 A | * | 2/2000 | Nemoto | ...................... | 713/201 |
| 6,041,166 A | * | 3/2000 | Hart et al. | ................... | 709/238 |
| 6,128,665 A | * | 10/2000 | Iturralde | ..................... | 709/238 |
| 6,230,194 B1 | * | 5/2001 | Frailong et al. | ............ | 709/220 |
| 6,339,595 B1 | * | 1/2002 | Rekhter et al. | ............. | 370/392 |
| 6,484,261 B1 | * | 11/2002 | Wiegel | ....................... | 713/201 |

OTHER PUBLICATIONS

Estrin, et al.; "A Unified Approach To Inter–Domain Routing", Request for Comments (RFC) 1322, May 1992.*
Steenstrup, et al.; "An Architechure for Inter–Domain Policy Routing", Request for Comments (RFC) 1478, Jun. 1993.*
Bellovin, et al.; "Network Firewalls"; IEEE Communications Magazine, Sep. 1994, pp. 50–57.*

* cited by examiner

*Primary Examiner*—Marc D. Thompson
(74) *Attorney, Agent, or Firm*—Osha & May L.L.P.

(57) ABSTRACT

A computer network includes one or more service computers configured to provide multiple network services via the network, and one or more connection devices that allow multiple network client computers to access the services via the network. The network also includes a single routing computer that serves as a firewall through which all traffic between the network services and the network client computers must pass.

18 Claims, 2 Drawing Sheets

PROVIDING SECURE ACCESS TO NETWORK SERVICES

CROSS-REFERENCE TO RELATED APPLICATIONS

This application is a continuation of abandoned U.S. patent application Ser. No. 09/039,197 filed on Mar. 13, 1998. Further, this application is related to and incorporates by reference abandoned U.S. patent application Ser. No. 09/042,338 filed Mar. 13, 1998, by Chris Cunningham and entitled "Providing Network Services Through a Common Interface."

BACKGROUND

Administrators of local area networks (LANs) frequently purchase network services, such as Internet access or network management services, from entities known as network service providers. To receive these network services, a customer must connect its LAN to the network service provider's LAN, which presents several security concerns. Among these concerns are unwanted infiltration of the network service provider's LAN by its customers and by other outside entities, unwanted access to a customer's LAN by other customers, and unwanted interception of information passing between the network service provider and its customers.

The network service provider often deals with security concerns such as these by erecting firewalls or providing dedicated connections to its service machines. In general, these solutions require a dedicated firewall for each customer or a private connection for each customer to each service machine.

SUMMARY

In one aspect, the invention involves providing multiple network services to multiple network client computers via a computer network. The network client computers are allowed to access the services via one or more connection devices in the network, and all traffic between the network services and the network client computers is required to pass through a single routing computer that acts as a firewall.

In some embodiments, all traffic between the computer network and the network client computers may be required to pass through at least one other routing computer that acts as a firewall. Either or both of the routing computers may include a static route table containing predefined rules that govern the flow of traffic between the network services and the network client computers. Moreover, the network client computers may be allowed to access the network through several types of connections, including public frame relay, PPP, and ISDN connections. The network client computers also may be allowed to access the network services via the Internet, in which case all traffic between the network services and the Internet may be required to pass through another routing computer that acts as a firewall.

In another aspect, the invention involves providing a network service to multiple network client computers via a computer network. All traffic between the computer network and each of the network client computers is required to pass through one of two routing computers that act as firewalls, and all traffic between the network service and the network client computers to pass through another routing computer that acts as a firewall.

In some embodiments, a static route policy is applied to govern the flow of traffic between the network services and the network client computers. The route policy may be divided among multiple route tables, each stored in one of the routing computers.

Each embodiment of the invention may provide one or more of several advantages. For example, a single security policy for a computer network may be distributed across multiple firewalls, which in turn may be managed remotely from virtually anywhere within the network. Multiple network services may be provided via the network, and multiple customers of the network service provider may access the network to receive these services. The network may support a variety of connection technologies, including frame relay, asynchronous transfer mode (ATM), Point-To-Point Protocol (PPP), Integrated Services Digital Network (ISDN) and Internet connections, which reduces or eliminates the need for customers to reconfigure their LANs. Moreover, the network may support multiple customers and multiple connectivity options with minimal network components and physical connections.

Virtual LANs (VLANs) may be used to allow software and hardware reconfigurations of the network, including the relocation of service machines, without requiring customers to reconfigure their LANs and without revising the security policy. Static routing policies may be used in the firewalls to simplify management an improve security of the network.

DETAILED DESCRIPTION

Figure 1:
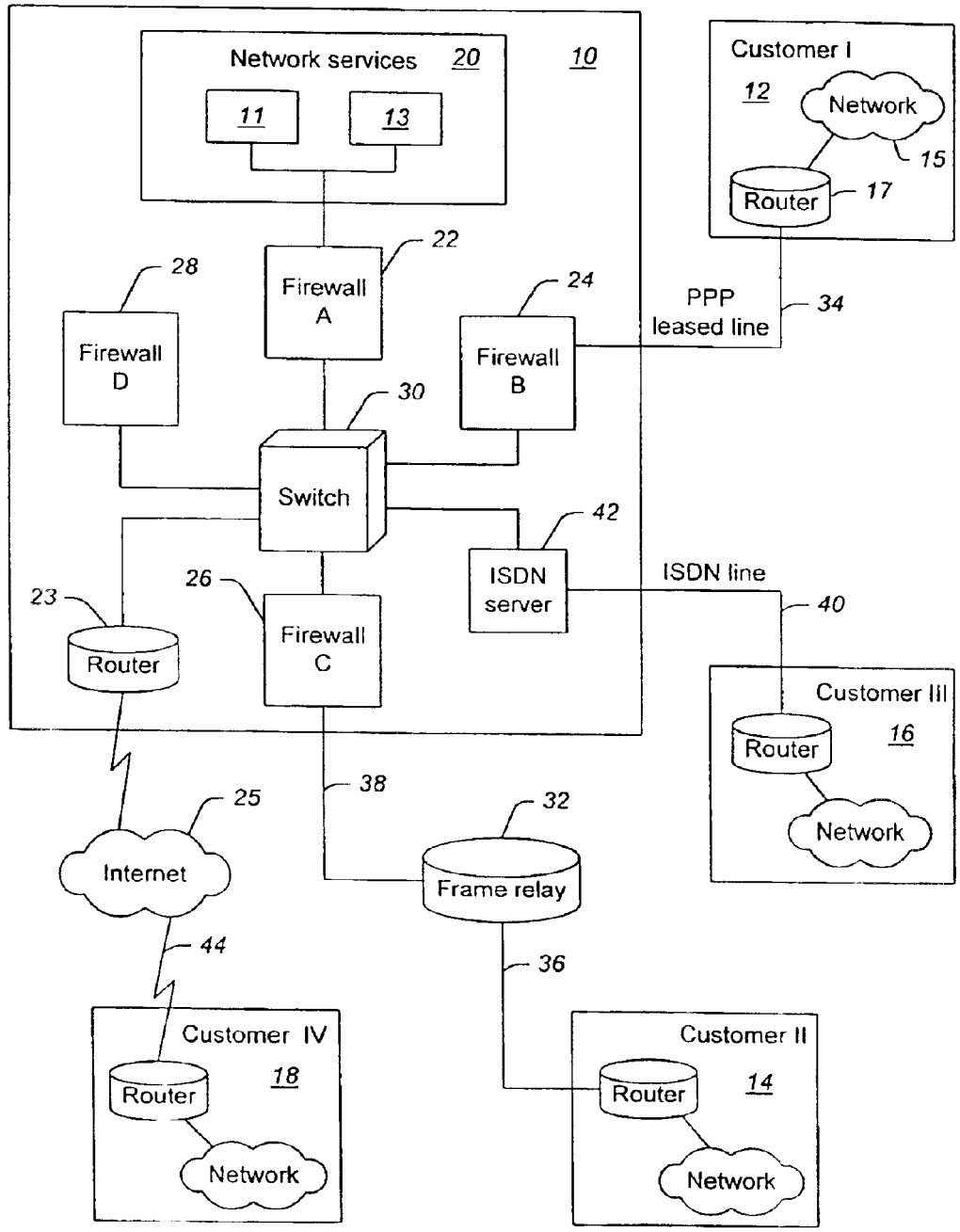
FIG. 1 is a block diagram of a network over which a network service provider delivers services securely to multiple customers.

Referring to FIG. 1, a network service provider maintains a secure customer access network (SCAN) 10 that allows unrelated customers at remote physical sites 12, 14, 16, 18 to receive network services 20, such as network management, trouble ticketing and Internet access, through a common, secure architectural interface. The SCAN 10 employs network switching, virtual local area network (VLAN) and firewall technology to provide the network services 20 in a secure manner to a virtually unlimited number of customers using only a minimum of network components. The SCAN 10 is capable of providing the network services 20 over a wide variety of connections, including frame relay (FR), private leased line, asynchronous transfer mode (ATM), Point-to-Point Protocol (PPP) and Integrated Services Digital Network (ISDN) connections. The SCAN 10 also includes a router 23, e.g., a Cisco 7000 router, that maintains a full Internet route table and that serves as a full Border Gateway Protocol (BGP) peer to several Internet service providers (ISPs). This router 23 allows a SCAN customer to access the network services 20 and the customer's own network via the Internet 25 and to access the Internet 25 from the customer's network via the SCAN 10. Each customer site 12, 14, 16, 18 typically includes a computer subnetwork, e.g., a local area network (LAN) 15, and a router 17 capable of connecting the LAN 15 to other computer networks, including the Internet 25.

Some of the network services 20 provided by the SCAN 10 may be implemented as executable programs running on programmable computers 11, 13, e.g., network server computers, in a subnetwork maintained by the network service provider. In general, each computer 11, 13 in the subnetwork is dedicated to providing one of the network services. The computers 11, 13 may operate under different operating systems, e.g., Unix and Windows NT, or they all may run under the same operating system. The network services may be provided as described in U.S. patent application Ser. No. 09/042,338 filed on Mar. 13, 1998, by Chris M. Cunningham and entitled "Providing Network Services Through a Common Interface" (incorporated by reference).

Some of the network services 20 process and generate information that is proprietary to individual customers, so the SCAN 10 must ensure that information exchanged between the group of network services 20 and any given customer cannot be accessed by anyone other than that customer. The network service provider also may want to prevent unauthorized communications between customers through the SCAN 10. To do so, the SCAN 10 recognizes each subnetwork of computers as a unique physical domain, or group, each of which must be protected from users in the other groups. In particular, the SCAN 10 treats each customer site 12, 14, 16, 18 as a unique group and treats the network services 20 as a unique group. The SCAN 10 also treats any other subnetwork maintained by the network service provider, e.g., a subnetwork connecting administrative personnel, as a separate group, and it treats the Internet router 23 as a separate group.

A logical connection device or LAN switch 30, e.g., a Xylan OmniSwitch, allows the SCAN 10 to create broadcast domains, known as virtual LANs (VLANs), among the various physical domains (groups). Each VLAN represents a logical connection created by the LAN switch 30 between computers located in different physical domains. In other words, the LAN switch 30, through VLANs, allows computers in different logical networks to communicate with each other, via connections made either internally within the LAN switch 30 or externally through a security device, such as a firewall. Thus, the LAN switch 30 allows users at the customer sites 12, 14, 16, 18 to access the network services 10 maintained by the network provider. The SCAN 10 may use several policies to define VLANs, including any of the following: (1) a port-based policy, which assigns computers in the various groups to VLANs based on the physical ports to which they attach in the SCAN 10; (2) a media access control (MAC) address-based policy, which defines VLANs based on the physical layer addresses of the computers in the various groups; and (3) an Internet Protocol (IP) address policy, which defines VLANs based on the network layer addresses of the computers in the various groups. Even though each computer may belong to only one group, which is determined by the computer's physical location, each computer may belong to multiple VLANs.

Figure 2:
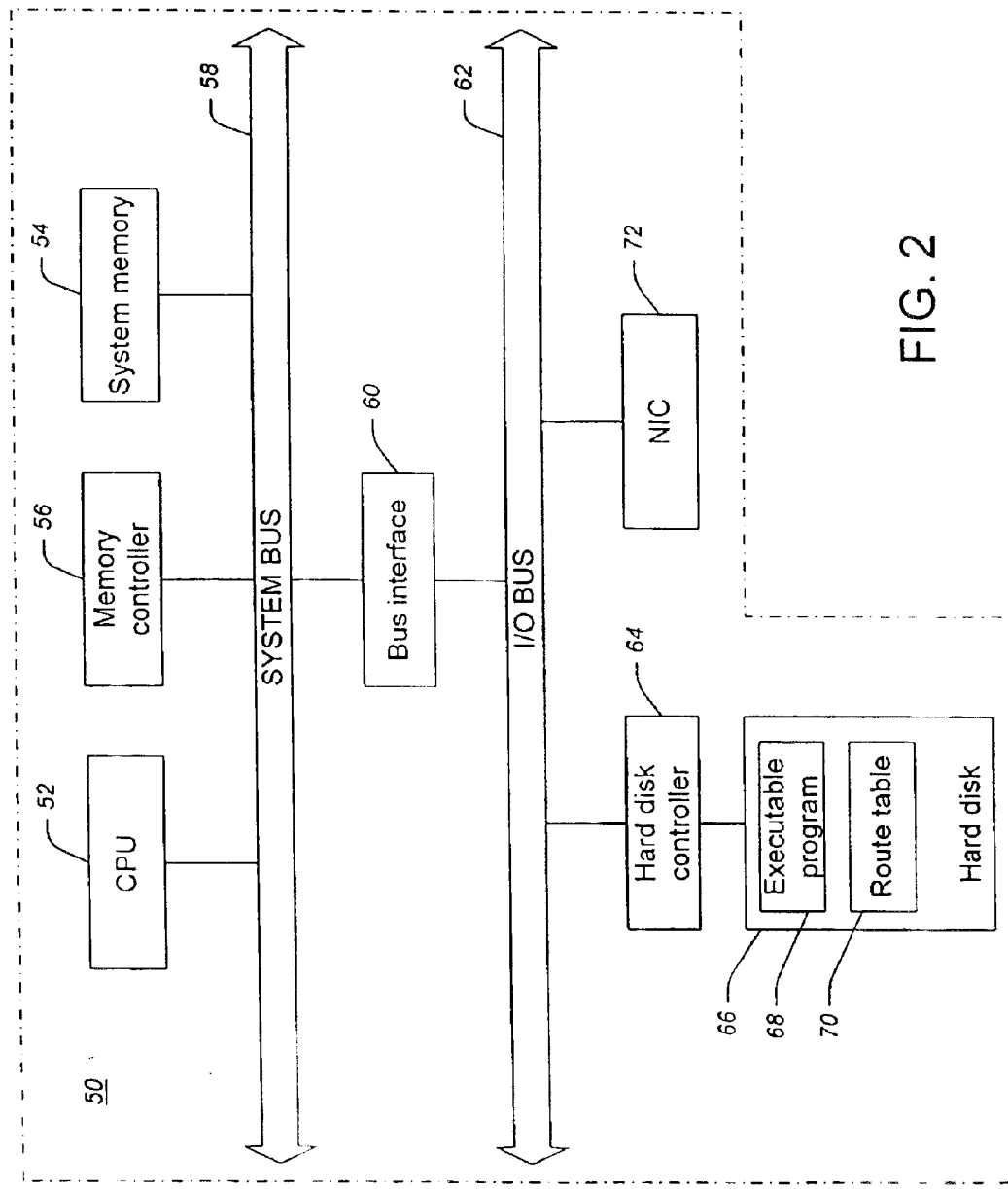
FIG. 2 is a block diagram of a network server computer used to implement a firewall.

The SCAN 10 protects the groups and the information flowing between groups by requiring all group-to-group communications to pass through at least one of four firewalls 22, 24, 26, 28, each of which implements a single, static routing policy. The SCAN 10 further protects the group of network services by requiring all communications between this group and any other group to pass through two of the four firewalls. Referring also to FIG. 2, each of the firewalls may be implemented as a network server computer 50, e.g., a Sun Sparc workstation, running an executable program 68, such as Checkpoint's "Firewall-1" software, that has been loaded from a fixed storage medium, e.g., a hard disk 66, into the computer's system memory 54. Each firewall routes TCP/IP (Transmission Control Protocol/Internet Protocol) data packets according to a static routing policy defined by a route table 70, which also may be stored in the hard disk 66. Packets that meet all of the conditions prescribed in a firewall's route table are forwarded by the firewall to the appropriate destination; packets that do not meet the prescribed conditions are discarded. Implementing a static routing policy in each firewall ensures that no one other that the network service provider can change the routing policy within the SCAN 10, which in turn ensures that the network service provider's customers receive secure access to the SCAN 10. Also, because the routing policy is static, the firewalls do not propagate any routing information to the customer sites 12, 14, 16, 18 or to the Internet 25. Instead, the routers 17 in the customer sites are configured with static routes to the SCAN 10, as discussed below.

Referring again to FIG. 1, each of the four firewalls 22, 24, 26, 28 implements a single route policy that pertains only to transactions involving certain physical domains (groups). The first firewall 22 (Firewall A) protects the group of network services 20 from unwanted penetration by users in other groups by inspecting all traffic passing to and from the network services 20, including communications among the network services 20 themselves. The route policy implemented in the first firewall 22 includes two rulesets (listed as source/destination/service): (1) a "service group/any/any" ruleset, which allows the network service provider to access any other group using any of the network services; and (2) a "customer/service group/service" ruleset, which allows any bona fide customer to access the group of network services 20 using any service for which the customer subscribes.

The other three firewalls 24, 26, 28 serve to ensure that only bona fide customers of the network service provider are able to access the SCAN 10. Each of these firewalls provides access only to those customers that meet certain service-subscription criteria. For example, the second firewall 24 (Firewall B) provides access only to customers that access the network services 20 directly through the SCAN 10 and that do not receive Internet access from any source other than the network service provider. This type of customer is equipped with a static route to the second firewall 24 in its internal router. Customers that receive Internet service from a source other than the network service provider, i.e., through any source other than the SCAN 10, cannot access the second firewall 24. This limitation ensures that customers receiving Internet service from another source cannot send traffic improperly through the second firewall 24 instead of through the Internet. The route policy implemented in the second firewall 24 includes three rulesets: (1) a "service group/any/any" ruleset, which allows the network service provider to access any other group using any of the network services; (2) a "customer/firewall A/service" ruleset, which allows the customer to access, through the first firewall 22, the group of network services using any service for which the customer subscribes; and (3) a "customer/Internet/services" ruleset, which allows the customer to access the Internet via the Internet router 23 using any service for which the customer subscribes. The third ruleset may be defined to limit Internet access to certain users within the customer's physical domain or to certain services, e.g., e-mail only.

The third firewall 26 (Firewall C) provides access only to customers that access the network services 20 directly through the SCAN 10 and that receive Internet service from a source other than the network service provider. This type of customer is equipped with a static route to the third firewall 26 in its internal router. The route policy implemented in the third firewall 26 includes two rulesets: (1) a "service group/any/any" ruleset, which allows the network service provider to access any other group using any of the network services; and (2) a "customer/firewall A/service"

ruleset, which allows the customer to access, through the first firewall 22, the group of network services using any service for which the customer subscribes.

The fourth firewall (Firewall D) 28 provides access to customers that receive any of the network services 20 via the Internet 25. The route policy implemented in the fourth firewall 28 includes two rulesets: (1) a "service group/any/any" ruleset, which allows the network service provider to access any other group using any of the network services; and (2) a "customer-via-Internet/firewall A/service" ruleset, which allows the customer to access, through the first firewall 22, the group of network services using any service for which the customer subscribes. Customers that access the SCAN 10 via the Internet 25 may experience reduced transmission bandwidth and extra delays beyond the control of the network service provider.

As mentioned above, the customers of the network service provider can connect to the SCAN 10 using a variety of connection technologies, including frame relay, ATM, PPP, ISDN and Internet connections. For example, the first customer site (Customer I) 12 in FIG. 1 accesses the SCAN 10 through a PPP line 34 that terminates directly at either the second firewall 24 or the third firewall 26, depending on whether the customer 12 receives Internet service from any source other than the network service provider, as discussed above. A PPP link typically involves a dedicated physical connection, or physical port, at a firewall and therefore requires the customer to lease the link from the network service provider. Each PPP link also accounts for one IP interface at the firewall.

The second customer site (Customer II) 14 in FIG. 1 accesses the SCAN 10 through a link 36 to a frame relay 32 that terminates directly at either the second firewall 24 or the third firewall 26. In general, each link 38 from a frame relay to a firewall requires a dedicated synchronous port on the firewall, but since each frame relay link 38 can support multiple permanent virtual circuits (PVCs), and therefore multiple customers, each firewall can support a considerable number of customers via frame relay connections.

The third customer site (Customer III) 16 in FIG. 1 accesses the SCAN 10 through an ISDN line 40 that terminates at an ISDN server 42, e.g., a Cisco 4500M server, within the SCAN 10. The ISDN server 42 connects physically to the LAN switch 30, which in turn forms a logical connection between the ISDN server 42 and either the second firewall 24 or the third firewall 26, depending upon whether the customer 16 receives Internet access from any source other than the network service provider. Because the ISDN server 42 is used to terminate ISDN links to the SCAN 10, the second and third firewalls each need dedicate only one IP interface to service all customers with ISDN links. The ISDN server 42 may provide additional security for the SCAN 10 by ending each ISDN call as soon as it begins, using the standard ISDN "Caller ID" feature to reestablish a connection with the caller, and then using an authentication protocol, such as the "Challenge Handshake Authentication Protocol" (CHAP), to verify that the caller is a bona fide customer.

The fourth customer site (Customer IV) 18 in FIG. 1 accesses the SCAN 10 via a link 44 to the Internet 25. This customer also may access the SCAN 10 in other ways, e.g., through a frame relay or PPP connection, via either the second firewall 24 or the third firewall 26, as discussed above.

Referring again to FIG. 2, each firewall is implemented as a programmable computer 50 having, among other things, a central processing unit (CPU) 52, a memory controller 54, and a system memory 56 coupled to a system bus 58. The system memory 56 may include a random access memory (RAM) 106 and a non-volatile memory 108, e.g., a writable read-only memory such as a flash ROM. The computer 50 also includes a fixed storage medium, such as a hard disk 66, and a hard disk controller 64 coupled via an input/output (I/O) bus 62, which in turn is coupled to the CPU bus 58 by a bus interface device 60. The computer 50 may be preprogrammed, e.g., in ROM, to serve as a firewall, or it may be programmed by loading an executable program 68 from a storage medium, such as the hard disk 66, a floppy disk or a CD-ROM, into system memory 56. The executable program 68 accesses a route table 70, which may be stored on the hard disk 50, to determine how to route information through the firewall. The computer 50 also includes a network interface controller 72 coupled to the I/O bus 62 which enables the computer 50 to connect to one or more computer networks.

Other embodiments are within the scope of the following claims.

What is claimed is:

1. A computer network comprising:
   at least one service computer configured to provide multiple network services via the computer network,
   at least one connection device that allows multiple network client computers to access the network services via the computer network,
   a logical connection device coupled between the service computers and the network client computers and configured to create logical broadcast domains among the network services and the network client computers,
   wherein each logical broadcast domain comprises a logical grouping of selected network services and selected network client computers, and at least two routing devices each implementing a single static route policy that governs flow of traffic between the network services and the network client computers and prevents unauthorized access to the computer network, wherein each of the routing devices provides independent routing to the network services.

2. The computer network of claim 1, wherein the logical connection device is configured to allow access via a public frame relay.

3. The computer network of claim 1, wherein the logical connection device is configured to allow access via a PPP link.

4. The computer network of claim 1, wherein the logical connection device is configured to allow access via an ISDN link.

5. The computer network of claim 1, wherein the logical connection device is configured to allow access via the Internet.

6. The computer network of claim 1, wherein the static route policy is defined by a static route table.

7. The computer network of claim 1, wherein the network client computers belong to multiple logical broadcast domains.

8. The computer network of claim 1, wherein the logical broadcast domains allow communication between network client computers internally within a switch device.

9. The computer network of claim 1, wherein the logical broadcast domains allow communication between network client computers externally through at least one of the at least two routine devices.

10. A method for use in providing network services via a computer network to multiple network client computers, the method comprising:

allowing the network client computers to access the network services via one or more connection devices in the computer network, creating logical broadcast domains among the network services and the network client computers, wherein each logical broadcast domain comprises a logical grouping of selected network services and selected client computers, and requiring all traffic within the network services to pass through routing devices that each implement a single static route policy to prevent unauthorized access, and requiring all traffic between the network services and the network client computers to pass through at least two routing devices that each implement a single static route policy.

11. The method of claim 10, further comprising allowing the network client computers to access the network via a public frame relay.

12. The method of claim 10, further comprising allowing the network client computers to access the network via a PPP link.

13. The method of claim 10, further comprising allowing the network client computers to access the network via an ISDN link.

14. The method of claim 10, further comprising allowing the network client computers to access the network via the Internet.

15. The method of claim 10, wherein the static route policy is defined by a static route table.

16. The method of claim 10, wherein the network client computers belong to multiple logical broadcast domains.

17. The method of claim 10, further comprising allowing communication between network client computers internally within a switch device by the logical broadcast domains.

18. The method of claim 10, further comprising allowing communication between network client computers externally through the routing computer by the logical broadcast domains.

* * * * *

UNITED STATES PATENT AND TRADEMARK OFFICE
CERTIFICATE OF CORRECTION

| | | |
|---|---|---|
| PATENT NO. | : 6,877,041 B2 | Page 1 of 1 |
| APPLICATION NO. | : 09/898977 | |
| DATED | : April 5, 2005 | |
| INVENTOR(S) | : James M. Sullivan and James A. Keddie | |

It is certified that error appears in the above-identified patent and that said Letters Patent is hereby corrected as shown below:

In the claims:

In column 6, Claim 9, line 64, please replace "routine" with --routing--.

Signed and Sealed this
Third Day of July, 2012

David J. Kappos
*Director of the United States Patent and Trademark Office*